(12) United States Patent
Hart

(10) Patent No.: US 8,249,176 B2
(45) Date of Patent: Aug. 21, 2012

(54) METHOD FOR DETERMINATION OF BRIDGED TAPS ON A TRANSMISSION LINE

(75) Inventor: Richard Hart, Concord, CA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 837 days.

(21) Appl. No.: 12/274,549

(22) Filed: Nov. 20, 2008

(65) Prior Publication Data

US 2010/0124261 A1    May 20, 2010

(51) Int. Cl.
*H04B 3/00* (2006.01)
(52) U.S. Cl. .......................... 375/257; 375/222
(58) Field of Classification Search ............ 375/257, 375/222
See application file for complete search history.

(56) References Cited

U.S. PATENT DOCUMENTS

| | | | |
|---|---|---|---|
| 6,744,854 B2 | 6/2004 | Berrier et al. | |
| 7,302,379 B2 | 11/2007 | Cioffi et al. | |
| 7,388,906 B2 | 6/2008 | Hart et al. | |
| 7,773,666 B2 * | 8/2010 | Belge et al. | 375/222 |
| 7,852,910 B2 * | 12/2010 | Belge | 375/222 |
| 2003/0235274 A1 * | 12/2003 | Afzal | 379/1.04 |
| 2004/0120470 A1 * | 6/2004 | Cambron et al. | 379/1.04 |
| 2005/0238037 A1 | 10/2005 | Dodds et al. | |
| 2006/0098725 A1 * | 5/2006 | Rhee et al. | 375/222 |
| 2007/0025548 A1 * | 2/2007 | Zheng et al. | 379/406.01 |
| 2007/0121793 A1 * | 5/2007 | Wang et al. | 379/1.04 |
| 2007/0274513 A1 * | 11/2007 | Wang et al. | 379/380 |
| 2008/0089485 A1 * | 4/2008 | Duvaut et al. | 379/1.03 |
| 2008/0292064 A1 * | 11/2008 | Wu et al. | 379/22.04 |

OTHER PUBLICATIONS

Petrie, "An Evaluation of Loading Systems" IEEE Transactions on Communication Technology, vol. 13, Issue: 1, Publication Year: 1965, pp. 121-134.*
Kumar, "Loop Diagnostics in DSL", NCC, Jan. 8, 2008.*

* cited by examiner

*Primary Examiner* — Juan A Torres
(74) *Attorney, Agent, or Firm* — Hoffmann & Baron, LLP

(57) ABSTRACT

The present invention is directed to determining a length of at least one bridged tap on a transmission line. The invention includes estimating an Equivalent Working Length (EWL) associated with the transmission line using an $H_{log}$ spectrum by converting at least one $H_{log}$ data point in an EWL estimation, determining the shortest EWL estimation to be an EWL associated with the tap, and determining loss due to the tap by subtracting the $H_{log}$ for a straight piece of 26G wire of length EWL from the input data $H_{log}$. The losses are then removed from the $H_{log}$ spectrum using the EWL. A tap associated with a peak can be identified in a Fourier analysis of the $H_{log}$ spectrum. A length of a tap is determined using a Chi-squared analysis by verifying a tap, subtracting the theoretical loss due to the tap from the $H_{log}$ spectrum and repeating the process until all taps are identified.

20 Claims, 13 Drawing Sheets

PRIOR ART

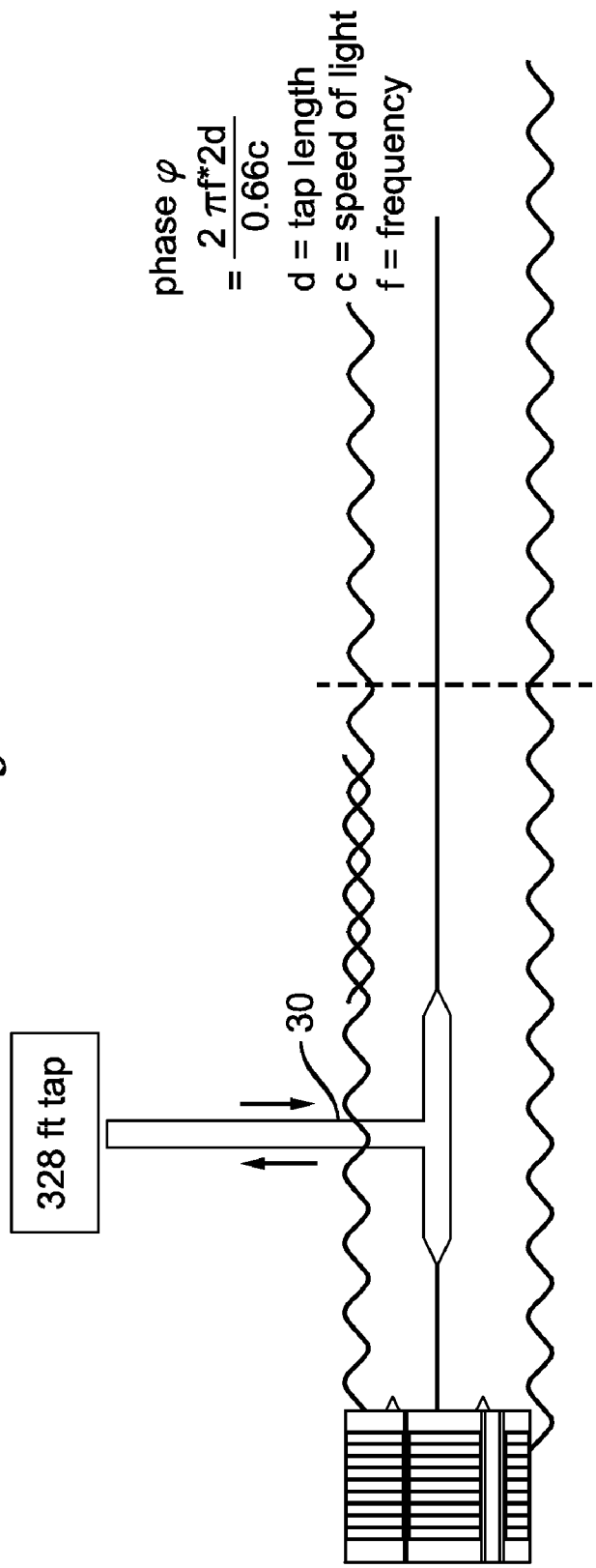

FIG. 4

$$\int \cos wt * \{ \cos(wt) + \cos(wt+\varphi) \} \quad \overset{18}{\swarrow}$$

$= \int \cos wt * \{ \cos(wt) + \cos(wt+\varphi) \}$ $= \int \cos^2 wt + \int \cos wt * \cos(wt+\varphi)$ $= C + \int \cos wt * \{\cos(wt)\cos(\varphi) - \sin(wt)\sin(\varphi)\}$ (where $C = \int \cos^2 wt$ represents the recovered data signal)

$= C + \int \cos wt * \{\cos(wt)\cos(\varphi) - \sin(wt)\sin(\varphi)\}$ $= C + \int \cos^2 wt *\cos(\varphi) - \int \mathbf{\cos(wt)*\sin(wt)\,\sin(\varphi)}$ $\underline{= C\,(1+\cos(\varphi));}$ (Integral of even * odd function over even interval = 0)

600 ft tap ⟋20

328 ft tap hlog ⟋22

HLOG Superposition of two taps vs Computed

⟋24

3000 ft loop - tap = 110 ft and 380 ft

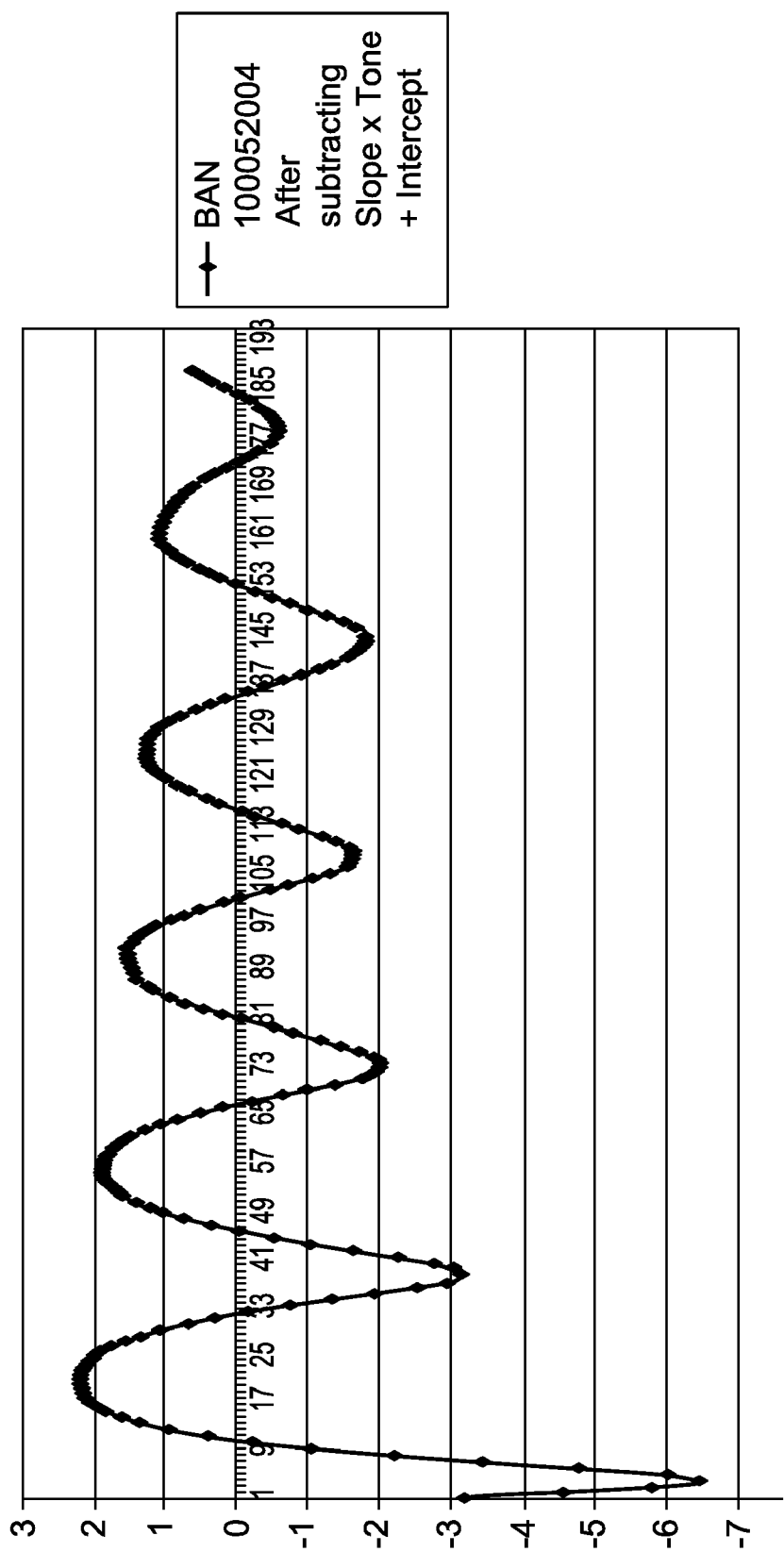

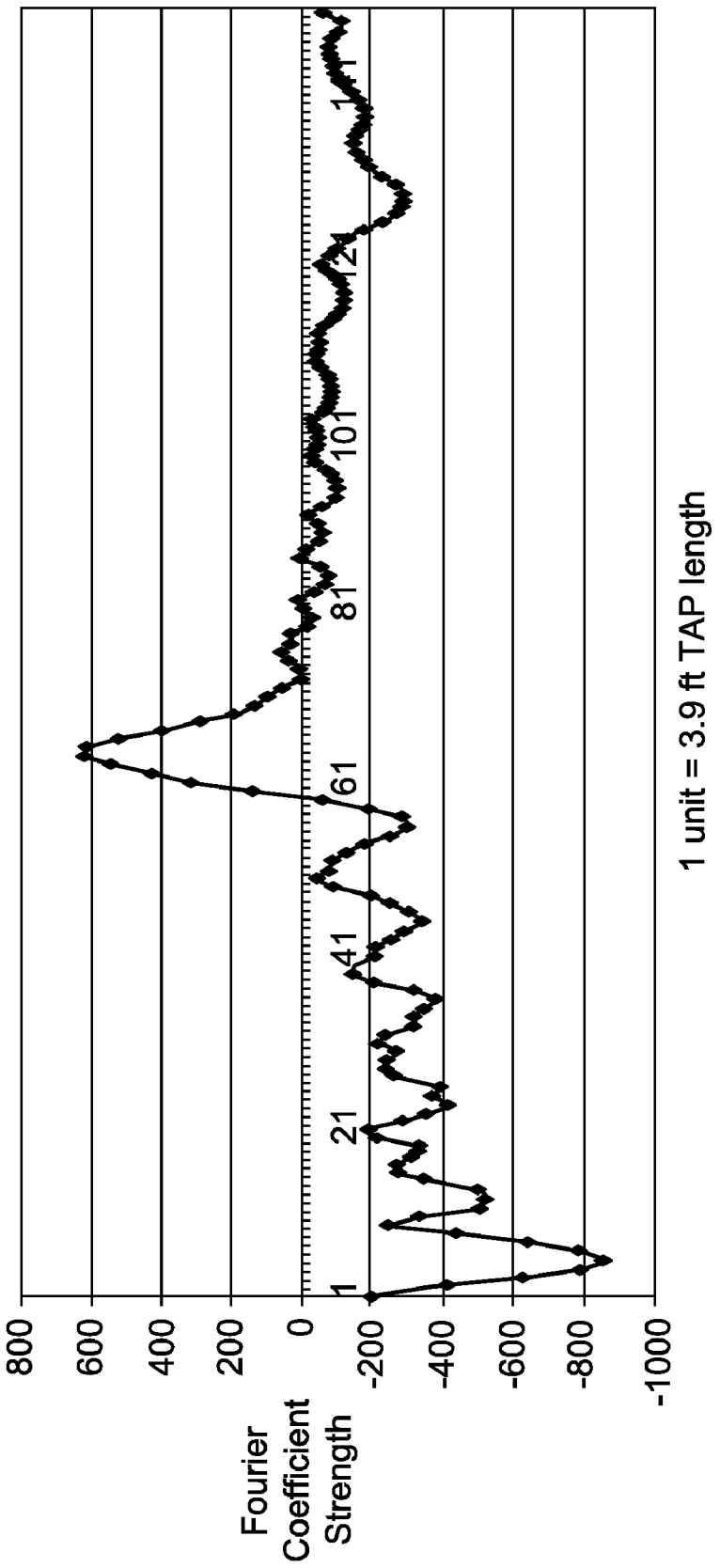

FIG. 10

A small piece of PERL code computes the Fourier coefficients.

Fourier Coefficients

```
$max_fft_coeff=150;  # test only up to 9.3ft * 150 ft taps
$minfitchan=30; $maxfitchan=850;
$channels=$maxfitchan-$minfitchan+1;
LOOP:
  $computed_tap_length=int( 9.3*$ii );
  $factor=.1*$ii*2*3.14159/$channels;
  @coscoeff[$ii]=0;
  for ($jj=$minfitchan; $jj<$maxfitchan+1; $jj++)
  {
    $angle=$factor* ( $jj - .000004*$jj*$jj - .08*$jj) ; # (EM wave velocity correction)
    $ca=cos($angle) ;
    @coscoeff[$ii]+=@data_for_fft[$jj]*$ca;
  }
  @coscoeff[$ii]=int(@coscoeff[$ii]-@cos_fft_template[$ii]);
$ii++;
if ($ii<$max_fft_coeff) {goto LOOP}

@coscoeff[$ii]=int(@coscoeff[$ii]-
@cos_fft_template[$ii]) ;
```

Sample 211

Two Tap HLOG

METHOD FOR DETERMINATION OF BRIDGED TAPS ON A TRANSMISSION LINE

BACKGROUND OF THE INVENTION

1. Field of the Invention

The present invention relates to a method for detecting multiple bridged taps. Specifically, the method uses a series of measurements made between the network and customer end of a loop to determine the number and length of bridged taps on a transmission line.

2. Brief Description of the Related Art

Determination of 0, 1, or more taps and their lengths is of importance to transmission quality and the overall performance of networks, such as the transmission of broadband signals over twisted pair copper wire. A bridged tap is a condition where two or more transmission paths are spliced together and one path leads to the intended customer. The second path is usually an abandoned path to a former customer that is now disconnected. The alternate path is called a bridged tap. Efforts to construct an efficient method to determine multiple taps are not available.

SUMMARY OF THE INVENTION

Embodiments of the present invention are direction to a method, system, and computer readable medium for determining a length of at least one bridged tap on a transmission line. The present invention, which incorporates some of the preferred features, includes estimating an Equivalent Working Length (EWL) associated with the transmission line using an $H_{log}$ spectrum and then removing losses due only to the transmission line from the $H_{log}$ spectrum using the EWL. A tap associated with a peak can be identified in a Fourier analysis of the $H_{log}$ spectrum. A length of the tap can be determined using a Chi-squared analysis.

The method, system and computer readable medium may include estimating the EWL by converting at least one $H_{log}$ data point into an EWL estimation. This is accomplished by dividing the measured loss at the $n^{th}$ DMT tone by a standard loss per kft of a one kft length of 26G telephony cable. The shortest EWL estimation can be determined to be an EWL associated with the tap. Determining loss due to the tap by subtracting the $H_{log}$ for a straight piece of 26G wire of length EWL from the input data $H_{log}$. After subtracting the EWL from the $H_{log}$ the remainder is referred to as the Residue.

The method, system and computer readable medium may include correcting the $H_{log}$ curve residue. Correcting the $H_{log}$ curve residue includes calculating an average of lower half frequency values and an average of higher half frequency values of the $H_{log}$ residue, using the averages to form an equation of a line, and correcting the residue into a linear form using an equation $H_{log}' = H_{log} - (\text{slope} \times \text{DMTnumber} + \text{intercept})$.

The method, system and computer readable medium may include subtracting a loss associated with the tap from the $H_{log}$. Performing the Chi-squared analysis of the method, system and computer readable medium includes verifying a tap, subtracting the theoretical loss due to the at least one tap from the original $H_{log}$ spectrum, and reiterating the two steps until no tap is found.

Other objects and features of the present invention will become apparent from the following detailed description considered in conjunction with the accompanying drawings.

It is to be understood, however, that the drawings are designed as an illustration only and not as a definition of the limits of the invention.

BRIEF DESCRIPTION OF THE DRAWINGS

FIG. 3 shows an example the effect of a on a voltage wave.

FIG. 4 is a formula for the inverse Fourier transform, which is a derivation of the cosine term.

FIG. 8 is a graph depicting the correction of the $H_{log}$ residue for a linear offset.

FIG. 9 is a graph depicting Fourier coefficients.

FIG. 10 is a listing of PERL code that computes Fourier coefficients.

DETAILED DESCRIPTION OF THE EMBODIMENTS

A method for detecting multiple bridged taps on a transmission line in accordance with the present invention is accomplished by using a series of measurements made between the network and customer end of the loop to determine the number and length of bridged taps on the transmission line. Measurements made between the customer and network ends of the transmission path are currently used to determine the presence of 0 or 1 tap, but not more than 1. When multiple taps exist on the path, the measurements become convoluted and the current algorithm can fail to perform a deconvolution of multiple tap information conveyed in the measurements. The method of the present invention provides a deconvolution of these measurements and yields information on a plurality of taps. It does this by transforming from the time domain used in the prior art to a frequency domain through use of a Fourier analysis. Once in the frequency domain, each tap appears as a peak in the frequency spectrum.

An advantage of the present invention is that once multiple taps and their lengths are determined, other methods can be used to decide if the condition requires the dispatch of personnel to attempt to remove the taps or to move the customer to an alternative available transmission path. Knowledge regarding tap conditions is needed to properly evaluate potential causes of poor or degraded transmission performance supporting a customer's broadband service.

Figure 1:
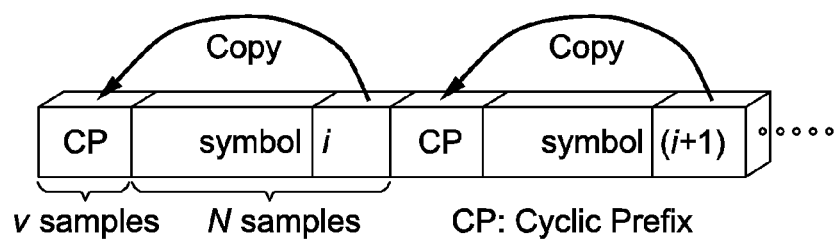
FIG. 1 is a depiction of information signaling in a DSL (Digital Subscriber Link) Transmission.

As shown in FIG. 1, the embodiments disclosed herein use a Discrete Multi-Tone (DMT) signal, which is the basic mode of DSL transmission. DMT tone spacing is 4.3125 kHz and has a range of about 25 kHz to 8 MHz or more.

Figure 2:
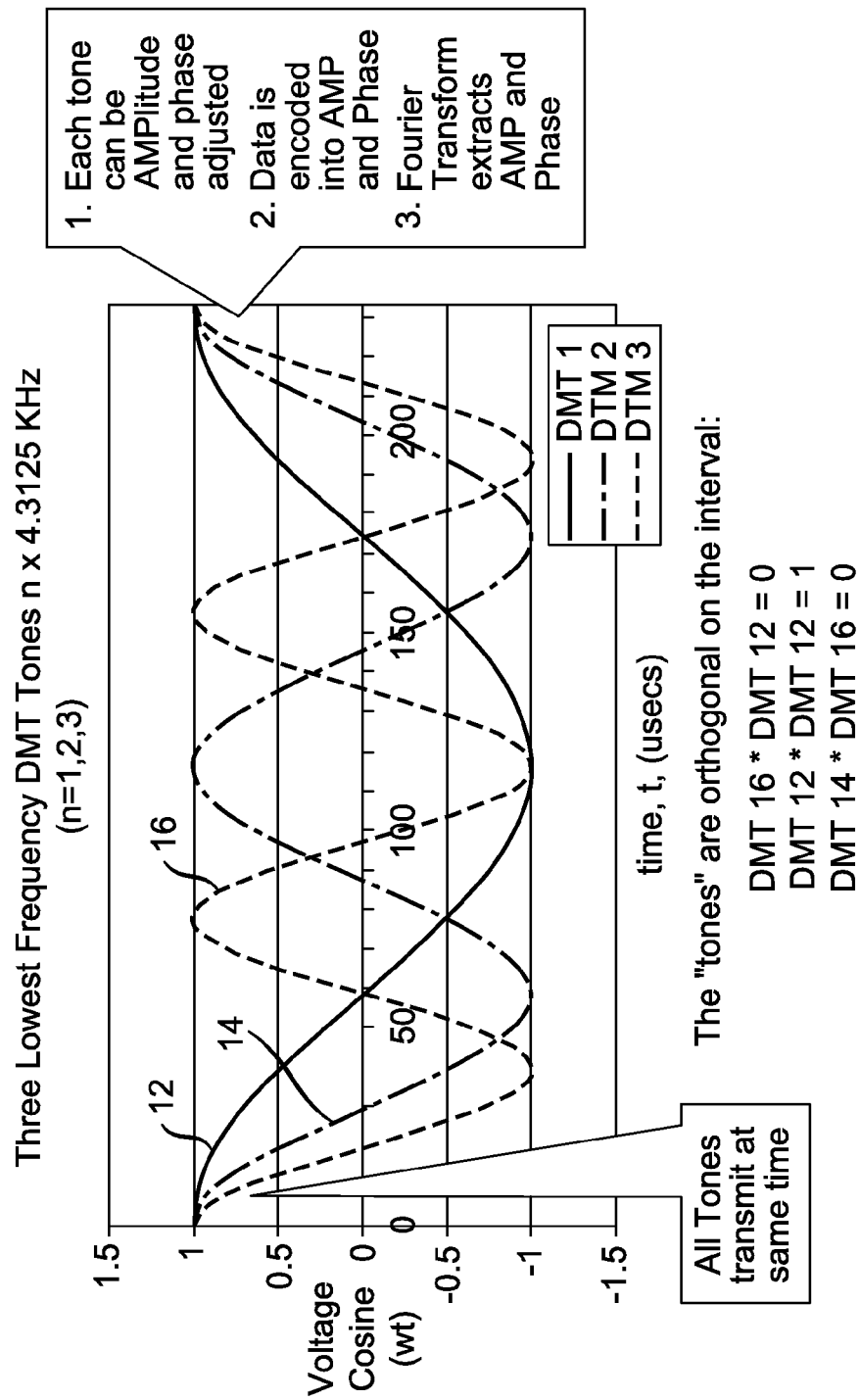
FIG. 2 is a graph depicting the three lowest frequency DMT tones.

FIG. 2 depicts the three lowest frequency DMT tones at n×4.3125 kHz where n=1, 2, or 3. All three tones, DMT 12, DMT 14, and DMT 16, are transmitted at the same time. Each tone can be amplitude and phase adjusted at the transmitting modem, and thus data is encoded into amplitude and phase. A Fourier transform at the receiver modem is used to extract amplitude and phase from the encoded signals. The tones are orthogonal on the interval represented by:

DMT 16*DMT 12=0;

DMT 12*DMT 12=1; and

DMT 14*DMT 16=0.

Orthogonal frequency-division multiplexing (OFDM) spreads the data to be transmitted over a large number of carriers, typically thousands. They have equal, precisely-chosen frequency spacing. This is the reciprocal of the duration, and is called the "active symbol period", over which the receiver examines the signal. This choice of carrier frequencies and duration ensures orthogonality. The demodulator for one carrier does not see the other carriers even though there is no explicit filtering and their spectra overlap. Therefore, there is minimal crosstalk between carriers. What seems to be a very complex process of modulating (and demodulating) hundreds of carriers simultaneously is equivalent to a Discrete Fourier Transform (DFT) operation, for which efficient Fast Fourier Transform (FFT) algorithms exist. Thus, integrated circuit implementations of OFDM modulators and demodulators are feasible for affordable mass-produced transmitters and receivers.

FIG. 3 depicts the effect of a tap on a voltage wave. At the point of the splice 30, there are two roughly equal waves out of phase by an amount equal to the round trip delay multiplied by the angular speed. The vector sum of the voltage waves is equal to cos (phase), which is the destructive interference that causes the signal to cancel itself. For the 328 foot tap shown in FIG. 3, the phase $\phi$ was computed and the destructive interference signal formed is equal to $1+\cos(\phi)$. The two waves move in and out of phase as the frequency changes and a cosine term appears in the loss spectrum ($H_{log}$) at the receiver.

FIG. 4 depicts a formula for an inverse Fourier transform 18, which is a derivation of the cosine term. In this formula, two waves reach the modem, the incident wave ($\cos(\omega t)$) and the phase shifted interfering wave ($\cos(\omega t+\phi)$). The modem recovers the DMT signal by multiplying the input by the DMT cosine and integrating over the period ($\frac{1}{4000}^{th}$ sec) of the DMT signal. The $n^{th}$ DMT corresponds to the frequency n×4.3125 kHz. Thus, the received waveform is multiplied by $\cos(\omega t)$ where $\omega$, the angular frequency, is $2\pi f = 2\pi n \times 4.3125$ kHz.

Figure 5A:
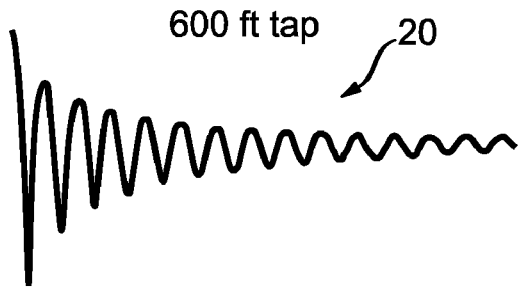
FIG. 5A is a depiction of a 600 foot tap.
Figure 5B:
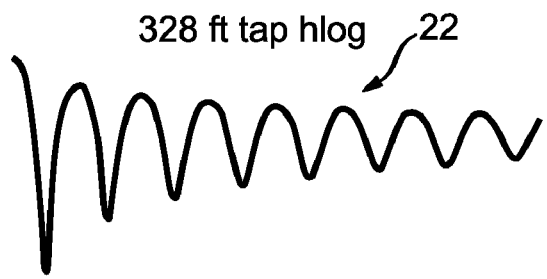
FIG. 5B is a depiction of a 528 foot tap.
Figure 5C:
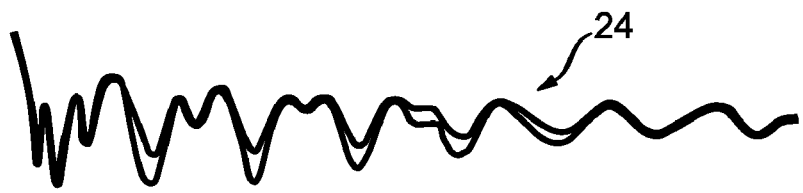
FIG. 5C is a depiction of plural taps to determine if the superposition principle applies in regard to FIG. 5A and FIG. 5B.
Figure 6:
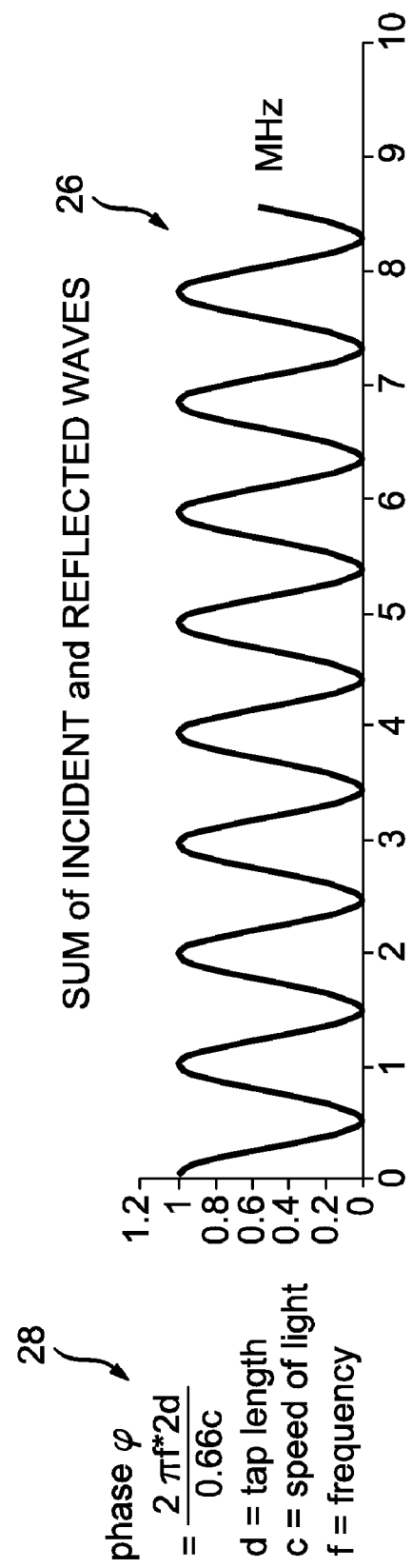
FIG. 6 is a graph of the sum of incident and reflected waves.

FIGS. 5A, 5B, and 5C show an $H_{log}$ superposition of two taps, one a 600 foot tap, and one a 328 foot tap. $H_{log}$ is a two ended symmetrical electrical measurement from one end of the loop to the other for providing magnitude values in a logarithmic scale. FIG. 5A is a 600 foot tap 20 and FIG. 5B is a 328 foot tap $H_{log}$ 22. FIG. 5C is an $H_{log}$ superposition of two taps 24, and leads to the conclusion that (1) superposition holds, (2) when $H_{log}$ has plural taps, each tap gives rise to its own characteristic cosine, and (3) a Fourier analysis should reveal the taps. FIG. 6 shows a sum of the incident waves and the reflected waves 26. From FIG. 6 it can be concluded that the tap causes the cosine term in $H_{log}$. Velocity dependence must also be repaired because the component of the loss due to the tap has a series of lobes and the valleys are not equally spaced in frequency. It is well known that the speed of an electromagnetic wave changes along a wire as a function of frequency. Using the following formula 28:

$$\text{phase}\varphi = \frac{2\pi f * 2d}{.66c},$$

where d=tap length, c=speed of light, and f=frequency. The "coefficient" or strength of the cosine term due to a tap of length d is:

$\Sigma_f H_{log}[f] * \text{cosine}(\phi(d,f))$.

Figure 7:
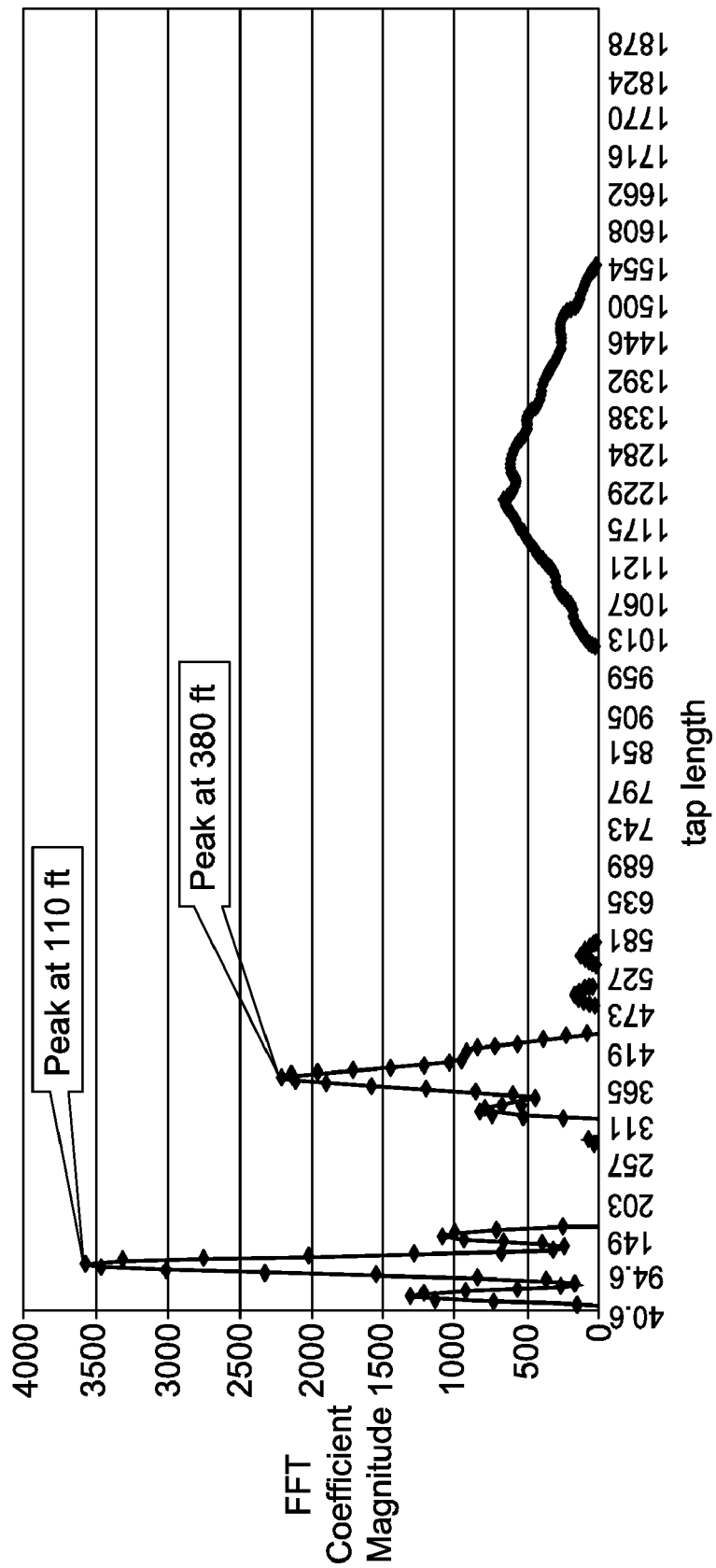
FIG. 7 is a graph depicting a Fourier analysis of the $H_{log}$ of a plural tapped loop.

FIG. 7 depicts a graph of a Fourier analysis of the $H_{log}$ spectrum showing plural tapped loops. The "coefficient" or strength of the cosine term due to a tap is shown in the graph as a peak. For example, a first peak represents a first tap having a length of 110 ft, while a second peak represents a tap having a length of 380 ft.

Figure 13:
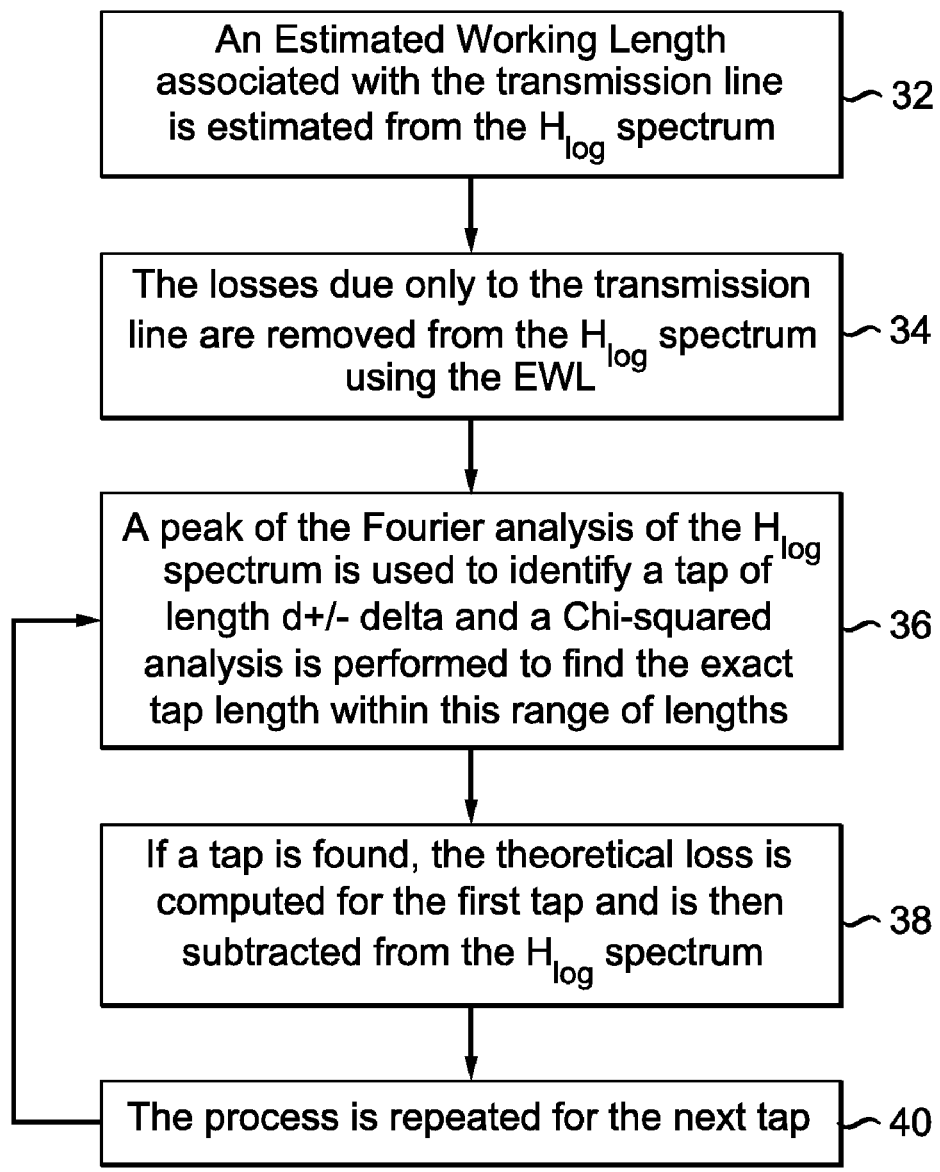
FIG. 13 is a flowchart depicting a method for determining a quantity and length associated with bridged taps on a transmission line.

The method for determining a quantity and length associated with bridged taps on a transmission line includes a five step process as seen in FIG. 13. First, an Equivalent Working Length (EWL) associated with the transmission line is estimated from the $H_{log}$ spectrum in step 32. The second step is to remove the losses due only to the transmission line from the $H_{log}$ spectrum using the EWL in step 34. In the third step, a peak of the Fourier analysis of the $H_{log}$ spectrum is used to identify a tap of length d+/− delta and a Chi-squared analysis is performed to find the exact tap length within the range in step 36. The Chi-squared analysis is used to determine whether the distributions of two variables are independent of each other and to test a sample against an expected distribution. Finally, if a tap is found, the theoretical loss is computed for the first tap and is then subtracted from the $H_{log}$ in step 38. This process is then repeated for successive taps in step 40.

Step 1 will now be described. Where the two modems are separated by a long length of transmission wire, the transmitted signal is distorted on its way to the receiving modem by transmission loss as a function of frequency due to both taps and the transmission path, the measured $H_{log}$ spectrum contained components due to taps, and a component due to the transmission path. The detection of taps is improved by first estimating the amount of loss due only to the transmission path and removing it from the $H_{log}$ loss spectrum. However, transmission line loss versus frequency is known and the $H_{log}$ curve can then be evaluated to determined how much loss is due to the transmission path. This is done by estimating the transmission length using the reference loss of 26G AWG cable at 70 feet as a standard length of wire. This provides the ability to remove the loss attributable to the wire whether due to the 26G telephone cable pairs or a mixture of gauges commonly used by telephone companies. The EWL is an industry standard measure of the ability of a line to support high speed data services. EWL is used to determine insertion loss of a loop and thus determining a service information rate that can be supported by a loop corresponding with a pair of twisted wire cable. Determination of EWL is useful in installation of a customer site. The first step, where EWL is estimated from the $H_{log}$ curve and subtracted out can be broken down into five processing steps. First, each $H_{log}$ data point is converted into an EWL estimation. The estimation is performed by dividing the measured loss at the $n^{th}$ DMT tone by the standard loss per kft at one kft length of 26G telephony cable as found in reference loss curves. The set of values is made for all DMT tones and the EWL length. Second, the EWL estimates are ordered by ascending length. Third, the shortest EWL estimator is taken to be the EWL of the tap. Fourth, the $H_{log}$ for a straight piece of 26G wire of length EWL is subtracted from the input data $H_{log}$. Finally, what is leftover is the loss due to taps and other artifacts, and this residue spectrum is processed for tap information.

Step 2 will now be described. Correcting the $H_{log}$ residue for a linear offset can be accomplished using a few processing steps. The residue may contain some leftover EWL from an imperfect estimation. This most often leaves ripple, due to taps superimposed on junk loss of the form Y=mX+b, such as a linear offset. The residue is corrected by estimating a function $H_{log}$=slope X DMTnumber+intercept. In one embodiment, the linear equation is formed by taking the average of the lower half frequency values and the average of the higher half frequency values of the $H_{log}$ residue and using the two points to form the equation of a line. The residue is then corrected for the linear form using the equation:

$$H_{log}'=H_{log}-(slope \times DMTnumber+intercept).$$

As seen in FIG. 8, after subtracting Slope×Tone+Intercept, the $H_{log}$ residue, after subtracting a linear correction, provides a good approximation of a cosine function, and the FFT of this corrected curve will be better defined than if the linear correction were not made.

FIG. 10 is an algorithm in PERL code to compute the Fourier coefficients. An important line of code in the algorithm is:

coscoeff[$ii]=int(coscoeff[$ii]-cos_fft_template[$ii]), which is key to the algorithm. Only the cosine wave coefficient is computed. A tap does not exist if the coefficient is negative or less than a minimum value determined from empirical data. This set of minimum FFT amplitudes is stored in an array "cos_fft_template". This array "cos_fft_template" is formed by examining the FFT of 400 VDSL (Very High Bitrate Digital Subscriber Line) $H_{log}$s and taking the $90^{th}$ percentile as the lower limit for indicating that a tap may exist.

To find the highest peak, as is done in Step 4, Fourier coefficients are examined and all positive peaks are identified. Since the amplitude of the $n^{th}$ Fourier coefficient is a mathematical representation of the magnitude of an oscillation cause by a tap, accordingly the program orders 0, 1, 2, or 3 peaks as GOOD, BETTER, and BEST with BEST being the highest peak above the template curve.

For example, if no peaks are found in sample 2 of the tested 400 Hlogs the following report is provided:
Sample→2
GOOD→0
BETTER→0
BEST→0

As a further example, if peaks are found in sample 27 of the tested 400 $H_{log}$ s the following report is provided:
AMPLITUDE=<615> amplitude of fft coefficient 63
AMPLITUDE=<49> amplitude of fft coefficient 75
AMPLITUDE=<23> amplitude of fft coefficient 77
Sample→27
GOOD→716.1 ft TAP length (corresponds to fft coefficient 63)
BETTER→697.5 ft TAP length (corresponds to fft coefficient 65)
BEST→585.9 ft TAP length (corresponds to fft coefficient 77)

In this case, the highest FFT amplitude is 615 units and identifies the "BEST" tap estimator.

The following results report when peaks are found in sample 27 of the test 400 $H_{log}$ s:
The "BEST" tap is a peak of major height. To be more certain, the PERL program gathers several bridged tap loss curves around the identified tap length value (taplength=9.3×63), corrects the tap loss spectra using a linear format as is done for the $H_{log}$ data, and then forms a Chi-squared fit and compares it to a benchmark Chi-squared estimate taken to be a flat line of 0 loss.
SAMPLE, 27, BONAFIDE TAP OF LENGTH, 550 ft, TAP PROBABILITY, 95%, Chisq for 5 ft Wire, 1865 Chisq of tap 80.

The Chi-squared analysis verifies that a 550 ft tap is an excellent fit to the $H_{log}$ data.

Figure 11:
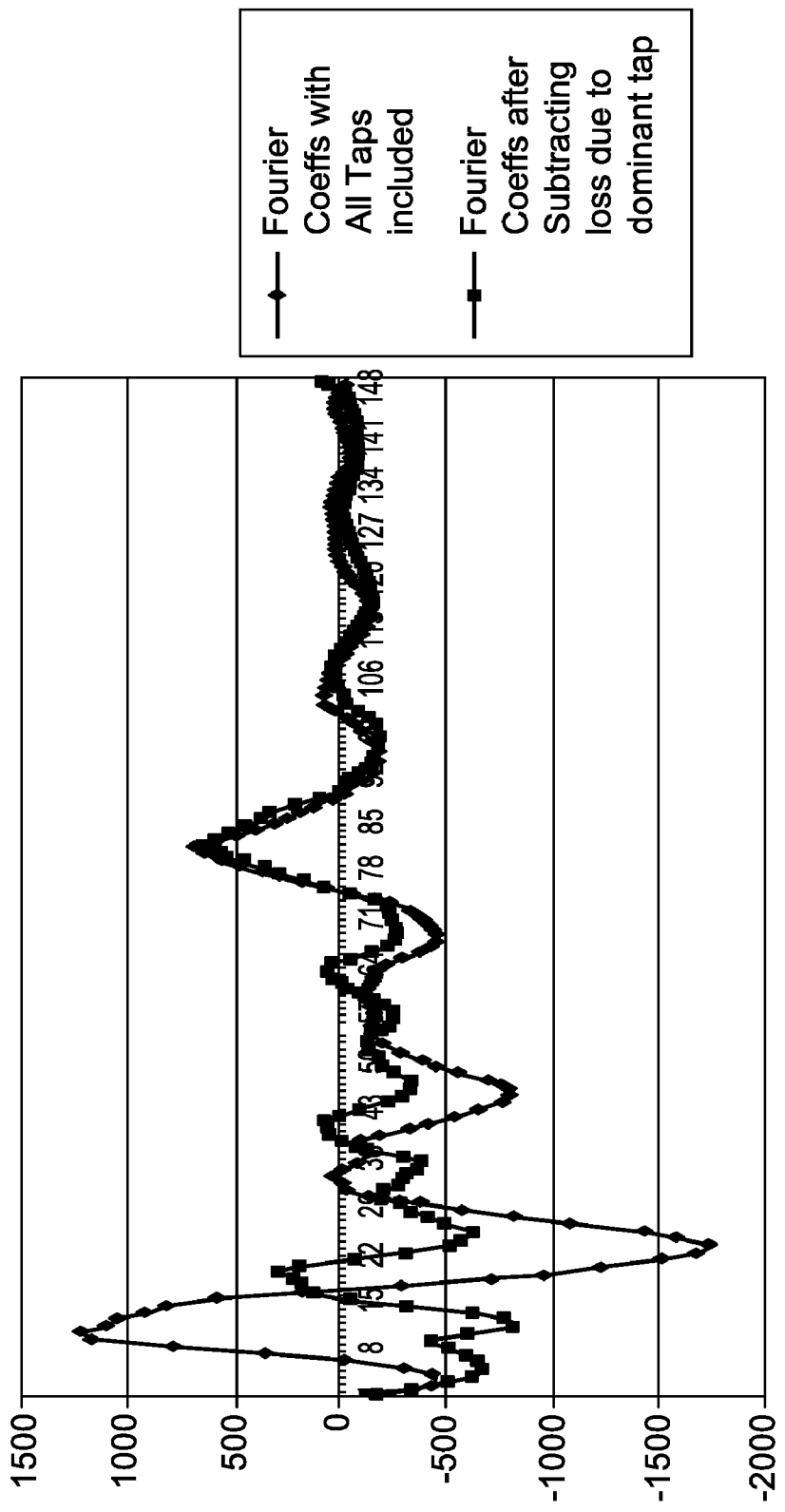
FIG. 11 is an example of a multitap VDSL (Very High Bit Rate Digital Subscriber Line) customer.
Figure 12:
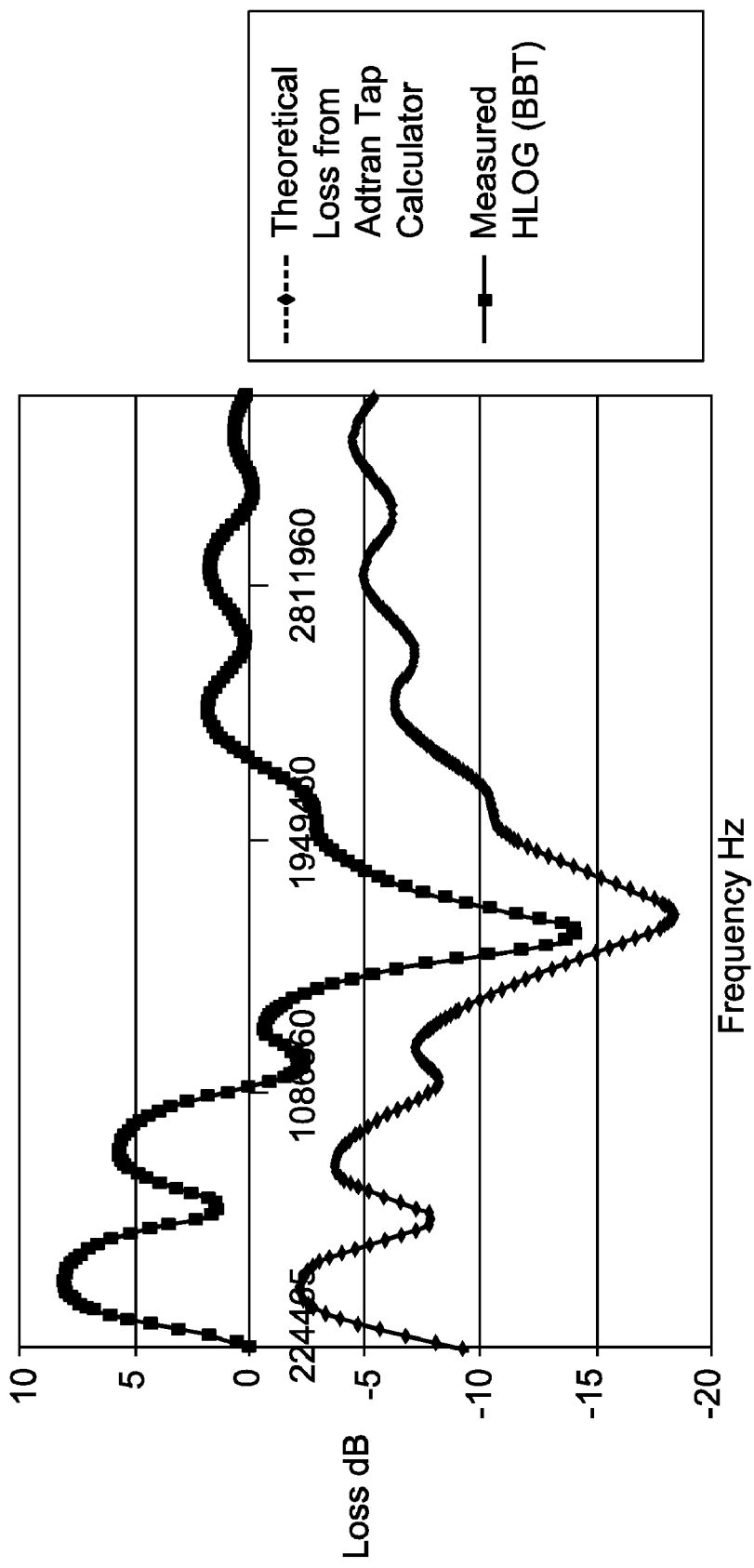
FIG. 12 is another example of a multitap VDSL customer.

After removing the EWL loss from the $H_{log}$, a Fourier transform is performed on the oscillation to move from the frequency domain into the distance domain. In doing so, the strength or frequency of oscillation is matched to the length of the tap. As the tap length is changed, so is the frequency of the oscillation that appears in the $H_{log}$ spectrum. When a tap is verified, the algorithm subtracts the theoretical loss of the bridged tap from the original $H_{log}$ spectrum and then restarts the tap identification process, looking for a second tap, third tap, and any successive taps. A sample of this is shown in FIG. 11, which is an empirical $H_{log}$ of a working DSL circuit. FIG. 12 illustrates an example two tap $H_{log}$ for a DSL circuit, showing the theoretical loss and the measured $H_{log}$.

Although preferred embodiments of the present invention have been described herein with reference to the accompanying drawings, it is to be understood that the invention is not limited to those precise embodiments and that various other changes and modifications may be affected herein by one skilled in the art without departing from the scope or spirit of the invention, and that it is intended to claim all such changes and modifications that fall within the scope of the invention.

What is claimed is:

1. A method for determining a length of at least one bridged tap on a transmission line, the method comprising:
estimating by a computing device an equivalent working length associated with the transmission line using an $H_{log}$ spectrum, the $H_{log}$ spectrum being obtained from at least three discrete-multi-tones transmitted from a transmitting modem to a receiving modem, each of the discrete-multi-tones being amplitude and phase adjusted;
removing by the computing device losses due to the transmission line from the $H_{log}$ spectrum using the equivalent working length;
identifying by the computing device a tap associated with a peak in the $H_{log}$ spectrum by performing a Fourier analysis to extract the amplitude and phase; and
determining by the computing device a length of the tap using a Chi-squared analysis.

2. The method of claim 1, wherein estimating the equivalent working length further comprises:
converting an $H_{log}$ data point into an equivalent working length estimation;
determining a shortest equivalent working length estimation to be an equivalent working length associated with the tap; and
determining loss due to the tap by subtracting an $H_{log}$ for a piece of telephony cable of the equivalent working length from an input data $H_{log}$.

3. The method of claim 2, wherein converting the $H_{log}$ data point into the equivalent working length estimation further comprises dividing measured loss at an $n^{th}$ discrete-multi-tone by a standard loss associated with a length of the telephony cable.

4. The method of claim 1, further comprising correcting a residue associated with the $H_{log}$ spectrum.

5. The method of claim 4, wherein correcting the residue associated with the $H_{log}$ spectrum further comprises:

calculating an average of lower half frequency values and an average of higher half frequency values of the residue;

forming an equation of a line using the average of the lower half frequency and the average of the higher half frequency; and converting the residue into a linear form using an equation, $H_{log}'=H_{log}-(\text{slope X DMTnumber}+\text{intercept})$.

6. The method of claim 1, further comprising subtracting a loss associated with the tap from the $H_{log}$ spectrum.

7. The method of claim 1, wherein performing the Chi-squared analysis comprises:

verifying a tap; and subtracting a theoretical loss due to the tap from the $H_{log}$ spectrum.

8. A non-transitory computer-readable storage medium storing instructions that, when executed by a computing device, cause the computing device to:

estimate an equivalent working length associated with a transmission line using an $H_{log}$ spectrum, the transmission line having at least one bridged tap;

remove losses due to the transmission line from the $H_{log}$ spectrum using the equivalent working length;

identify a tap associated with a peak in a Fourier analysis of the $H_{log}$ spectrum; and determine a length of the tap using a Chi-squared analysis.

9. The computer readable storage medium of claim 8, wherein execution of the instructions by the computing device, causes the computing device to:

convert an $H_{log}$ data point into an equivalent working length estimation;

determine a shortest equivalent working length estimation to be an equivalent working length associated with the tap; and determine loss due to the tap by subtracting the $H_{log}$ for a piece of telephony cable of the equivalent working length from an input data $H_{log}$.

10. The computer readable storage medium of claim 9, wherein execution of the instructions by the computing device to covert at least one $H_{log}$ data point into the equivalent working length estimation, causes the computing device to divide measured loss at an $n^{th}$ discrete-multi-tone by a standard loss associated with a length of the telephony cable.

11. The computer readable storage medium of claim 8, wherein execution of the instructions facilitates determining a quantity and length of the at least one bridged tap on the transmission line by causing the computing device to correct a residue associated with the $H_{log}$ spectrum.

12. The computer readable storage medium of claim 11, wherein execution of instructions to correct the residue associated with the $H_{log}$ spectrum further causes the computing device to:

calculate an average of lower half frequency values and an average of higher half frequency values of the $H_{log}$ residue;

form an equation of a line using the average of the lower half frequency and the average of the higher half frequency; and convert the residue into a linear form using an equation, $H_{log}'=H_{log}-(\text{slope X DMTnumber}+\text{intercept})$.

13. The computer readable storage medium of claim 8, wherein execution of the instructions facilitates determining a quantity and length of the at least one bridged tap on the transmission line by causing the at least one computing device to subtract a loss associated with the tap from the $H_{log}$ spectrum.

14. The computer readable storage medium of claim 8, wherein execution of the instructions by computing device to perform the Chi-squared analysis, causes the computing device to:

(a) verify a tap; and (b) subtract a theoretical loss due to tap from the $H_{log}$ spectrum.

15. A system for determining a length of at least one bridged tap on a transmission line, the system comprising a computing device configured to:

estimate an equivalent working length associated with the transmission line using an $H_{log}$ spectrum;

remove losses due to the transmission line from the $H_{log}$ spectrum using the equivalent working length;

identify a tap associated with a peak in a Fourier analysis of the $H_{log}$ spectrum; and determine a length of the tap using a Chi-squared analysis.

16. The system of claim 15, wherein the computing device is further configured to:

convert an $H_{log}$ data point into an equivalent working length estimation;

determine a shortest equivalent working length estimation to be an equivalent working length associated with the tap; and determine loss due to the tap by subtracting an $H_{log}$ for a piece of telephony cable of equivalent working length from an input data $H_{log}$.

17. The system of claim 15, wherein the computing device is further configured to correct a residue associated with the $H_{log}$ spectrum.

18. The system of claim 17, wherein the computing device is further configured to:

calculate an average of lower half frequency values and an average of higher half frequency values of the residue;

form an equation of a line using the average if the lower half frequency and the average of the higher half frequency; and converting the residue into a linear form using an equation, $H_{log}'=H_{log}-(\text{slope X DMTnumber}+\text{intercept})$.

19. The system of claim 15, wherein the computing device is further configured to subtract a loss associated with the tap from the $H_{log}$ spectrum.

20. The system of claim 15, wherein the computing device is further configured to:

verify a tap; and subtract a theoretical loss due to the tap from the $H_{log}$ spectrum.

* * * * *